(12) United States Patent
Samejima

(10) Patent No.: US 11,461,463 B2
(45) Date of Patent: Oct. 4, 2022

(54) INFORMATION PROCESSING DEVICE, INFORMATION PROCESSING METHOD, AND RECORDING MEDIUM

(71) Applicant: NEC CORPORATION, Tokyo (JP)

(72) Inventor: Ayaka Samejima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 16/765,711

(22) PCT Filed: Dec. 10, 2018

(86) PCT No.: PCT/JP2018/045202
§ 371 (c)(1),
(2) Date: May 20, 2020

(87) PCT Pub. No.: WO2019/117052
PCT Pub. Date: Jun. 20, 2019

(65) Prior Publication Data
US 2020/0302055 A1 Sep. 24, 2020

(30) Foreign Application Priority Data
Dec. 13, 2017 (JP) .............................. JP2017-238516

(51) Int. Cl.
*G06F 21/00* (2013.01)
*G06F 21/55* (2013.01)
*G06F 21/56* (2013.01)

(52) U.S. Cl.
CPC .......... *G06F 21/552* (2013.01); *G06F 21/566* (2013.01); *G06F 2221/2101* (2013.01); *G06F 2221/2135* (2013.01)

(58) Field of Classification Search
CPC ............. H04L 63/1425; H04L 63/0227; G06F 2221/2135; G06F 21/554; G06F 21/566; G06F 21/552; G06F 2221/2101
See application file for complete search history.

(56) References Cited

U.S. PATENT DOCUMENTS

| 2011/0185419 A1 | 7/2011 | Boteler et al. |
| 2012/0005743 A1 | 1/2012 | Kitazawa et al. |
| 2017/0013018 A1* | 1/2017 | Nakata .................... H04L 63/20 |

FOREIGN PATENT DOCUMENTS

| EP | 3 099 024 A1 | 11/2016 |
| JP | 2005-051809 A | 2/2005 |

(Continued)

OTHER PUBLICATIONS

Written Opinion for PCT/JP2018/045202, dated Feb. 19, 2019.
(Continued)

*Primary Examiner* — Tri M Tran
(74) *Attorney, Agent, or Firm* — Sughrue Mion, PLLC

(57) ABSTRACT

An information processing device according to the present invention includes: a memory; and at least one processor coupled to the memory. The processor performs operations. The operations includes: extracting, based on a first data extraction policy being a policy for extracting first processing data to be used for counting a first frequency related to a transmission source from communication data, the first processing data from the communication data; counting, based on a first counting policy being a policy for counting the first frequency relating to the transmission source in the first processing data, the first frequency related to the transmission source in the first processing data; and extracting, based on a first transmission-source extraction policy being a policy for extracting the transmission source and the first frequency, the transmission source.

8 Claims, 13 Drawing Sheets

(56) References Cited

FOREIGN PATENT DOCUMENTS

| | | |
|---|---|---|
| JP | 2008-085819 A | 4/2008 |
| JP | 2009-171431 A | 7/2009 |
| JP | 2009-231876 A | 10/2009 |
| JP | 2012-015684 A | 1/2012 |
| JP | 2015-198301 A | 11/2015 |
| WO | 2015/141630 A1 | 9/2015 |
| WO | 2018/225667 A1 | 12/2018 |

OTHER PUBLICATIONS

International Search Report for PCT/JP2018/045202, dated Feb. 19, 2019.
Japanese Office Communication for JP Application No. 2019-559611 dated Dec. 7, 2021 with English Translation.
Samejima et al., "Proposal of art Analysis Method for Cyber Attack Communications based on Long Term Network Observation", Jan. 26, 2018, pp. 1-7, Japan Cited in JP Office Communication.

\* cited by examiner

Fig. 3

COMMUNICATION DATA

| COMMUNICATION TIME | VERSION | PRIORITY | IDENTIFIER | PROTOCOL | TRANSMISSION SOURCE ADDRESS | DESTINATION ADDRESS | TRANSMISSION SOURCE PORT | DESTINATION PORT |
|---|---|---|---|---|---|---|---|---|
| DAY 1 00:01 | 4 | ... | ... | IP | A | B | | |
| DAY 1 16:10 | 4 | ... | ... | IP | A | C | | |
| DAY 1 16:11 | 4 | ... | ... | IP | C | A | | |
| DAY 1 16:12 | 4 | ... | ... | TCP | A | C | 22 | 22 |
| DAY 2 08:08 | 4 | ... | ... | TCP | A | C | 23 | 23 |
| DAY 2 12:04 | 4 | ... | ... | TCP | A | C | 80 | 80 |
| DAY 2 20:50 | 4 | ... | ... | IP | A | D | | |
| DAY 3 01:11 | 4 | ... | ... | UDP | G | B | 67 | 68 |
| DAY 4 03:30 | 4 | ... | ... | IP | A | B | | |
| DAY 4 15:15 | 4 | ... | ... | IP | A | E | | |
| DAY 5 22:22 | 4 | ... | ... | IP | A | D | | |
| DAY 6 11:11 | 4 | ... | ... | UDP | G | B | 123 | 123 |
| DAY 7 12:21 | 4 | ... | ... | IP | A | F | | |
| DAY 7 23:32 | 4 | ... | ... | IP | A | E | | |

FREQUENCY DATA

| DEPARTURE → DESTINATION | FREQUENCY | INITIAL TIME | FINAL TIME |
|---|---|---|---|
| A→B | 2 | 1日 00:01 | 4日 03:30 |
| A→C | 4 | 1日 16:10 | 2日 12:04 |
| C→A | 1 | 1日 16:11 | 1日 16:11 |
| A→D | 2 | 2日 20:50 | 5日 22:22 |
| G→B | 2 | 3日 01:11 | 6日 11:11 |
| A→E | 2 | 4日 15:15 | 7日 23:32 |
| A→F | 1 | 7日 12:21 | 7日 12:21 |

TRANSMISSION-SOURCE EXTRACTION POLICY: EXTRACT TRANSMISSION SOURCE COMMUNICATING WITH PLURALITY OF DESTINATIONS FOR SEVEN OR MORE DAYS.

TRANSMISSION SOURCE DATA

| TRANSMISSION SOURCE |
|---|
| A |

Fig. 9

SECOND PROCESSING DATA

| COMMUNICATION TIME | TRANSMISSION SOURCE | DESTINATION | PROTOCOL | DESTINATION PORT |
|---|---|---|---|---|
| DAY 1 00:01 | A | B | IP | |
| DAY 1 16:10 | A | C | IP | |
| DAY 1 16:11 | C | A | IP | |
| DAY 1 16:12 | A | C | TCP | 22 |
| DAY 2 08:08 | A | C | TCP | 23 |
| DAY 2 12:04 | A | C | TCP | 80 |
| DAY 2 20:50 | A | D | IP | |
| DAY 4 03:30 | A | B | IP | |
| DAY 4 15:15 | A | E | IP | |
| DAY 5 22:22 | A | D | IP | |
| DAY 7 12:21 | A | F | IP | |
| DAY 7 23:32 | A | E | IP | |

TRANSMISSION SOURCE A SCANS DESTINATION THAT RESPONDS.

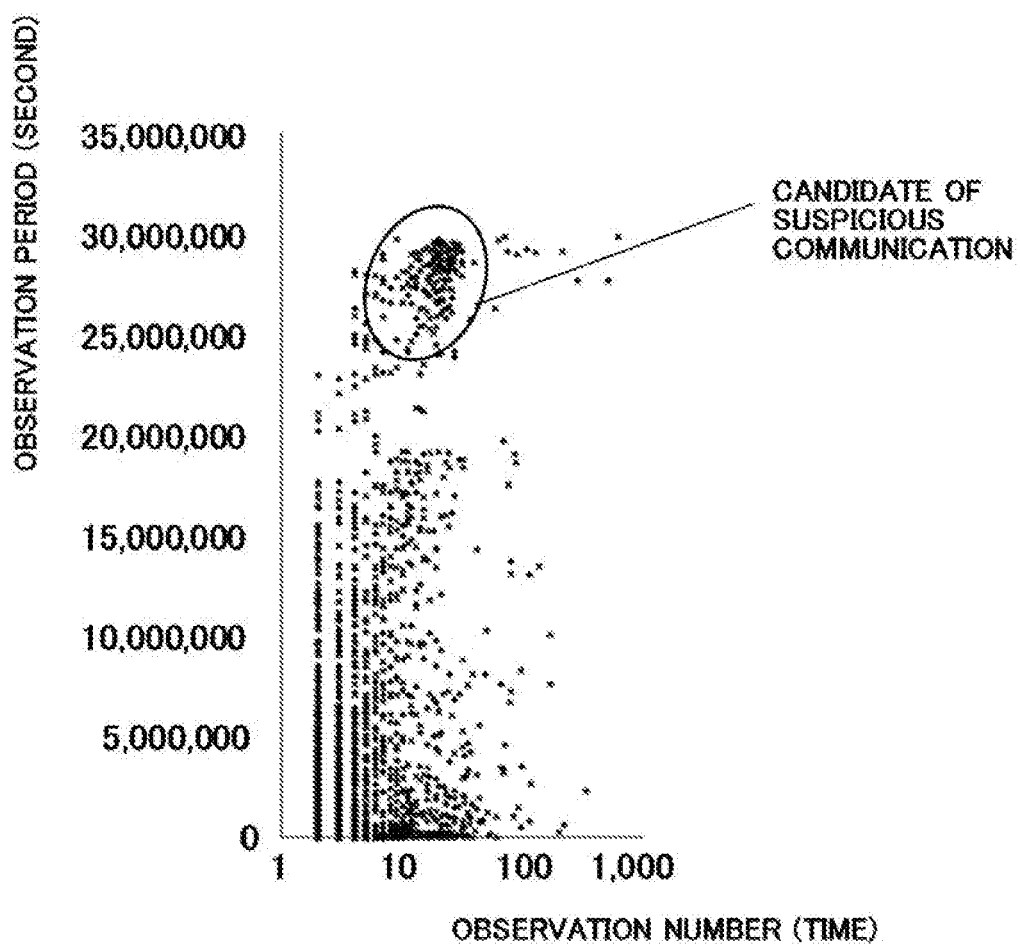

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2018/045202 filed Dec. 10, 2018, claiming priority based on Japanese Patent Application No. 2017-238516 filed Dec. 13, 2017, the disclosure of which is incorporated herein in its entirety by reference.

TECHNICAL FIELD

The present invention relates to processing of information, and particularly, relates to an information processing device and the like that process information related to detection of a transmission source.

BACKGROUND ART

With spread of a network such as the Internet, an unauthorized access by way of a network is increasing.

In a company or the like, an organization for achieving security of a network and a system connected to the network is placed. As an example of a device therefor, there are an instruction detection system (IDS), a security operation center (SOC), and the like.

Furthermore, a technique for achieving security in a network being used in an IDS or the like is suggested (e.g., see PTLs 1 to 4).

A technique described in PTL 1 detects an abnormality by using a previously stored "traffic rule".

A technique described in PTL 2 detects an abnormality by using a previously stored "signature".

A technique described in PTL 3 determines a header of a packet collected at a set interval per second/minute, by using previously stored "abnormal packet information".

A technique described in PTL 4 executes statistical processing using a packet being a monitor target.

CITATION LIST

Patent Literature

[PTL 1] Japanese Unexamined Patent Application Publication No. 2008-085819
[PTL 2] Japanese Unexamined Patent Application Publication No. 2009-171431
[PTL 3] Japanese Unexamined Patent Application Publication No. 2009-231876
[PTL 4] Japanese Unexamined Patent Application Publication No. 2005-051809

SUMMARY OF INVENTION

Technical Problem

In order to securely operate a system and a network, it is preferable that even one unauthorized infringement is not caused.

However, techniques described in PTLs 1 to 3 detect an abnormality by using information (e.g., a traffic rule, a signature, or abnormal packet information) relating to an abnormality such as an intrusion that occurred in the past. In other words, the techniques described in PTLs 1 to 3 require such an abnormal state as being intruded in an unauthorized way at least once.

A technique described in PTL 4 does not disclose detection of an abnormality.

Thus, the techniques described in PTLs 1 to 4 have an issue of being unable to identify a communication from a suspicious person or the like before an unauthorized intrusion.

An object of the present invention is to provide an information processing device and the like that solve the issue described above, and provide information for detecting a suspicious communication without requiring an unauthorized intrusion.

Solution to Problem

An information processing device according to one aspect of the present invention includes:
a memory; and
at least one processor coupled to the memory
The processor performs operations. The operations includes:
extracting, based on a first data extraction policy being a policy for extracting first processing data to be used for counting a first frequency related to a transmission source from communication data, the first processing data from the communication data;
counting, based on a first counting policy being a policy for counting the first frequency relating to the transmission source in the first processing data, the first frequency related to the transmission source in the first processing data; and
extracting, based on a first transmission-source extraction policy being a policy for extracting the transmission source, and the first frequency, the transmission source.

An information processing system according to one aspect of the present invention includes:
the above-described information processing device;
an indication device that indicates, to the information processing device, at least one of the first data extraction policy, the first counting policy, and the first transmission-source extraction policy;
a display device that receives and then displays the transmission source extracted by the information processing device; and
a firewall that blocks a communication relating to the transmission source received from the information processing device.

An information processing method according to one aspect of the present invention includes:
extracting, based on a first data extraction policy being a policy for extracting first processing data to be used for counting a first frequency related to a transmission source from communication data, the first processing data from communication data;
counting, based on a first counting policy being a policy for counting the first frequency relating to the transmission source in the first processing data, the first frequency related to the transmission source in the first processing data; and
extracting, based on a first transmission-source extraction policy being a policy for extracting the transmission source and the first frequency, the transmission source.

A non-transitory computer-readable recording medium according to one aspect of the present invention embodies a program. The program causes a computer to perform a method. The method includes:

extracting, based on a first data extraction policy being a policy for extracting first processing data to be used for counting a first frequency related to a transmission source from communication data, the first processing data from the communication data;

counting, based on a first counting policy being a policy for counting the first frequency relating to the transmission source in the first processing data, the first frequency related to the transmission source in the first processing data; and extracting, based on a first transmission-source extraction policy being a policy for extracting the transmission source and the first frequency, the transmission source.

Advantageous Effects of Invention

According to the present invention, it is possible to exert an advantageous effect of detecting a suspicious communication without requiring an unauthorized intrusion.

BRIEF DESCRIPTION OF DRAWINGS

FIG. 3 is a diagram illustrating communication data used for description of the operation of the information processing device according to the first example embodiment.

FIG. 9 is a diagram illustrating one example of second processing data of the information processing device according to the second example embodiment.

FIG. 13 is a diagram illustrating a result of counting an observation period and an observation number for each transmission source in certain communication data.

EXAMPLE EMBODIMENT

Figure 1:
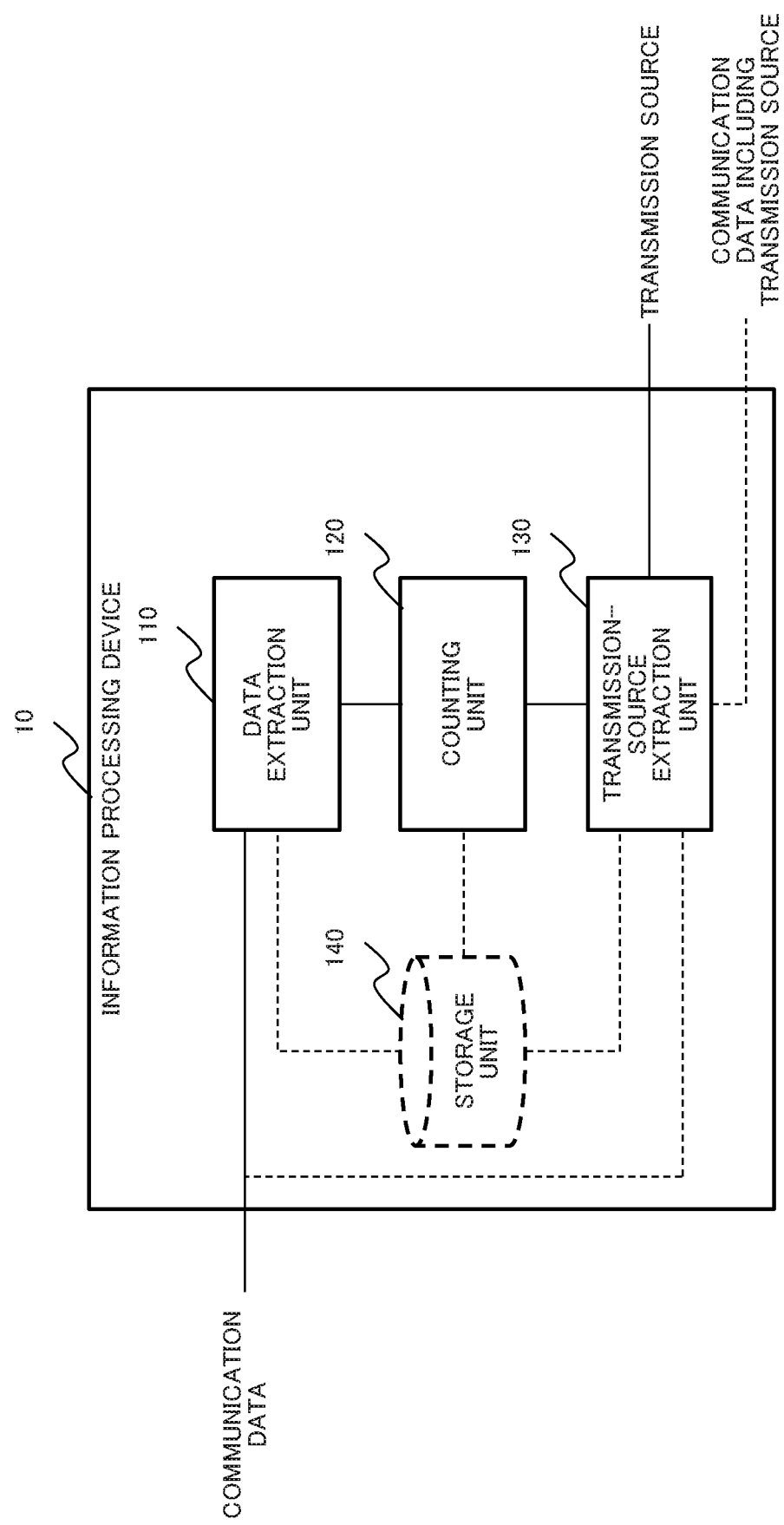
FIG. 1 is a block diagram illustrating one example of a configuration of an information processing device according to a first example embodiment in the present invention.

Example embodiments according to the present invention are described below with reference to the drawings.

Each drawing serves to describe the example embodiments in the present invention. Each example embodiment is not limited to the description in each drawing. The same number is given to a similar component in each drawing, and repeated description thereof may be omitted. In a drawing used for the following description, description is omitted and no illustration may be given with regard to a configuration of a part that are not concerned with description of the example embodiments.

<Technique Related to the Invention>

First, a technique related to the present invention is described.

A general device or organization, such as an IDS, that detects a fraud (hereinafter, simply referred to as an "IDS") is intended to interrupt an unauthorized intrusion itself. Specifically, an IDS achieves interruption of unauthorized communication data by directly determining received communication data.

Thus, data in a comparatively short period (generally, several minutes to several hours, or approximately one day at longest) are used as a continuous monitoring time for communication in an IDS.

However, in order to achieve an unauthorized intrusion, an infringer plotting an unauthorized intrusion searches for, before the intrusion, an intrusion port enabling an intrusion in a targeted system. Then, when finding an intrusion port, the infringer intrudes the system from the found intrusion port in an unauthorized way.

For this search, a communication (a communication that is not determined to be unauthorized) being undistinguishable from normal communication is used in order that an intrusion destination may not notice.

A certain number of such searches are required. Successive searches to the same destination in a short period have a higher possibility of being determined to be unauthorized. Accordingly, this search is generally repeated over a certain degree of a long interval (e.g., several days, one month, or several months), not manually but by utilizing a computer or the like. An interval used for a search may include a certain degree of variation in order to make detection of the search difficult.

FIG. 13 is a diagram illustrating a result of counting an observation period and an observation number for each transmission source in certain communication data.

Herein, the observation period is a time from the time when first communication is performed (initial time) to the time of final communication (final time).

Data in a range surrounded by an ellipse in FIG. 13 have a distribution (i.e., an operation) being apparently different from other data. For data in this range, several tens of communications occur during a period of 25 million to 30 million seconds (about 9.6 months to 11.6 months). In other words, one to several communications occur a month on average. Such a communication is a communication being unconceivable in a general communication, and is one of communications conceived as searching for an unauthorized intrusion. In other words, there is a possibility that a transmission source of such a communication is performing a communication in order to search for intruding in an unauthorized way.

Thus, an analysis using communication data over a long term is effective in identifying an unauthorized transmission source.

In order to detect a suspicious communication having a possibility of performing such a search, an analysis using data of communication over a comparatively long period as described above (e.g., for several months to one year in the case described above) is required. In other words, there is a possibility that an analysis using data of communication over a long period is able to find a transmission source performing an unauthorized communication that is conceived as a search before an intrusion.

However, data (communication data) communicated in a general network are significantly great in amount. For example, in a single organization (e.g., a department constituted of several to several tens of persons), a communication amount per day becomes several giga-bytes (GB) to several tens GB. A communication amount per month becomes several tens GB to several hundreds GB. A communication amount is considered to further increase in the further as well. Communication data have a length of several K-bytes on average.

Thus, when an attempt is made to process, without change, communication data communicated in a network over a long period such as several months to one year, processing of a significantly great amount of data is required.

For example, when an attempt is made to process communication data for several months, processing (e.g., statistical processing) using several hundreds GB data is required. It is difficult for a device such as an IDS to execute such processing within an effective time.

Thus, a general monitor device such as an IDS is unable to handle such an analysis of communication data for a long period, such as several months to several years, as to detect a transmission source of a suspicious communication.

However, in order to prevent an unauthorized infringement, it is desired that information for detecting a suspicious communication that can be used to search for an infringer or the like before an unauthorized infringement occurs, i.e., without requiring any unauthorized infringement, is provided. Such detection requires processing of communication data for several months to several years.

The example embodiments according to the present invention can provide information for detecting a suspicious communication using data for a long period, by using a configuration and an operation described below. In other words, the example embodiments according to the present invention can achieve provision of information for detecting a suspicious communication using data for a long period, without requiring an unauthorized infringement.

First Example Embodiment

An information processing device 10 according to a first example embodiment in the present invention is described below with reference to the drawings.

Data targeted for processing in the information processing device 10 according to the first example embodiment are not limited. The information processing device 10 may process data (communication data) communicated in a network. Alternatively, the information processing device 10 may process access data in a storage device (e.g., redundant arrays of inexpensive (independent) disks (RAID). In the following description, as one example, "communication data" are used as data targeted for processing. This does not limit data targeted for processing to communication data.

The information processing device 10 according to the first example embodiment in the present invention extracts a small amount (e.g., several bytes to several tens of bytes) of data (hereinafter, referred to as "processing data") from communication data.

The information processing device 10 extracts information (e.g., a transmission source of communication considered to be unauthorized) for detecting a suspicious communication in communication data for a long period (e.g., several days to several years), by using the extracted processing data. More specifically, the information processing device 10 counts a frequency related to a transmission source in processing data. The information processing device 10 extracts a predetermined transmission source from the processing data by using the frequency. Alternatively, the information processing device 10 may extract a predetermined transmission source from communication data by using the frequency.

The information processing device 10 may process communication data received by the information processing device 10. Alternatively, the information processing device 10 may process communication data transmitted and received by another device or organization.

For example, the information processing device 10 extracts, as processing data for detecting a suspicious transmission source in communication data, "a transmission source, a destination, and a communication time" in the communication data.

General communication data include a header and a payload. Generally, the header includes a transmission source and a destination. Thus, the information processing device 10 may extract the transmission source and the destination from the header.

A communication time may be a time at which a transmission source transmits communication data, or may be a time at which a destination receives communication data. In the following description, it is assumed that a communication time is a time at which a transmission source transmits communication data, as one example. A time at which a transmission source transmits is generally included in a header. Thus, the information processing device 10 may extract a communication time from a header.

This does not limit data extracted as processing data in the information processing device 10 according to the present example embodiment. For example, the information processing device 10 may extract not only a header of communication data but also predetermined data included in a payload.

Furthermore, when using data other than communication data, the information processing device 10 may use, as processing data, data in another part. For example, when using data used to access a predetermined storage device, the information processing device 10 may use an access source, an access destination, and an access time in the data.

[Description of Configuration]

First, a configuration of the information processing device 10 according to the first example embodiment is described with reference to the drawings.

FIG. 1 is a block diagram illustrating one example of the configuration of the information processing device 10 according to the first example embodiment in the present invention.

The information processing device 10 includes a data extraction unit 110, a counting unit 120, and a transmission-source extraction unit 130. The information processing device 10 may include a storage unit 140 that stores a result of each constituent unit. In this case, each constituent unit stores a result in the storage unit 140, and acquires necessary information (data) from the storage unit 140. Each constituent unit may acquire necessary information (data) from another constituent unit. Accordingly, in the following description, description of the storage unit 140 is omitted. Thus, FIG. 1 illustrates the storage unit 140 by using a broken line.

The data extraction unit 110 extracts, based on a data extraction policy, predetermined data included in communication data, as processing data.

The data extraction policy is a policy for the data extraction unit 110 to extract, from communication data, processing data that the counting unit 120 uses in order to count a frequency related to a transmission source. The data extraction policy is not limited. For example, when the counting unit 120 uses a transmission source, a destination, and a communication time for counting, the data extraction unit 110 may use a data extraction policy indicating "extract a transmission source, a destination, and a communication time". A data extraction policy may also include a policy relating to a period such as a period of extraction.

Communication data processed by the information processing device 10 are not limited. For example, the information processing device 10 may process communication data for a predetermined device or a predetermined organization. In this case, the communication data have the same destination. Thus, the data extraction unit 110 may extract "a transmission source and a communication time" as processing data. In this case, a data extraction policy includes "a transmission source and a communication time".

A data extraction policy may be determined based on communication data to be targeted, a transmission source desired to be extracted, or the like. For example, the above-described data extraction policy includes at least a transmission source and a communication time in communication data.

The data extraction unit 110 may previously store a data extraction policy. Alternatively, the data extraction unit 110 may receive a data extraction policy as an instruction from a user or the like, when extracting processing data.

In the following description, as one example, the data extraction unit 110 uses a data extraction policy indicating "extract a transmission source, a destination, and a communication time from communication data".

The data extraction unit 110 transmits the extracted processing data to the counting unit 120.

The counting unit 120 counts a frequency related to processing data, based on a counting policy.

A counting policy is a policy for counting a frequency related to a transmission source included in processing data. A counting policy is not limited. For example, the counting unit 120 may count an appearance frequency of a "transmission source" as a counting target. Alternatively, the counting unit 120 may count an appearance frequency of a "combination of a transmission source and a destination" as a counting target.

Alternatively, a counting policy may include a period related to counting (e.g., a time for starting counting and a time for ending counting). Further, a counting policy may include a plurality of periods. For example, the counting unit 120 may count frequencies in a plurality of periods (one day, two days, three days, . . . , one month, . . . , and one year) in which one day is a unit of increase.

In the following description, as one example, the counting unit 120 uses a counting policy indicating "count a frequency related to a combination of a transmission source and a destination".

Furthermore, the counting unit 120 may include other data in a frequency. For example, the counting unit 120 may include an "initial time" and a "final time" in communication of a "combination of a transmission source and a destination", in an appearance frequency of a "combination of a transmission source and a destination".

A timing of counting by the counting unit 120 is not limited. For example, the counting unit 120 may receive processing data extracted by the data extraction unit 110, and then count a frequency for each reception. Alternatively, the counting unit 120 may count a frequency by using processing data stored in a predetermined storage unit (e.g., the storage unit 140).

The counting unit 120 may previously store a counting policy. Alternatively, the counting unit 120 may receive a counting policy as an instruction from a user or the like, when counting a frequency.

The counting unit 120 transmits the counted frequency to the transmission-source extraction unit 130.

The transmission-source extraction unit 130 extracts a transmission source, based on a transmission-source extraction policy and the received frequency.

A transmission-source extraction policy is a policy for extracting a transmission source by using a frequency. A transmission-source extraction policy is not limited. For example, a transmission-source extraction policy is a policy including a threshold value of a frequency or a frequency range relating to a transmission source to be an extraction target. For example, the transmission-source extraction unit 130 may extract a transmission source having a frequency higher than a predetermined threshold value. Further, when a frequency and/or a transmission-source extraction policy include other data, the transmission-source extraction unit 130 may extract a transmission source by using other data. For example, when a transmission-source extraction policy includes a period and a threshold value, the transmission-source extraction unit 130 may extract a transmission source of which a frequency in the period exceeds a predetermined threshold value. There may be a plurality of threshold values. For example, a transmission-source extraction policy may include a range between two threshold values. In this case, the transmission-source extraction unit 130 may use a frequency included in a predetermined range (a range of two threshold values).

Herein, when the information processing device 10 uses a policy for detecting a suspicious communication as a policy, a transmission source extracted by the information processing device 10 is information for detecting a suspicious communication. For example, a user of the information processing device 10 targets, for analysis, communication data relating to an extracted transmission source, as a candidate for a suspicious communication.

The information processing device 10 uses processing data (data having a data amount smaller than communication data) extracted by the data extraction unit 110. Thus, the information processing device 10 can extract a transmission source by using processing data for a long period (e.g., several days to several years). In other words, the information processing device 10 can detect a transmission source in communication for a long period, based on a predetermined policy. In such detection using communication data for a long period, a suspicious communication before an unauthorized intrusion can be detected. The information processing device 10 extracts information (e.g., a transmission source) for detecting a suspicious communication in communication data for a long period, based on a policy (a data extraction policy, a counting policy, and a transmission-source extraction policy).

The user of the information processing device 10 can acquire, from the information processing device 10, a transmission source extracted based on a predetermined policy (a data extraction policy, a counting policy, and a transmission-source extraction policy) in communication data for a long period.

A transmission source is one example of information for detecting a suspicious communication. For example, an internet protocol (IP) address is allocated in line with an area to some degree. Accordingly, when the information processing device 10 uses a transmission area (e.g., a range of an IP address) of a suspicious communication as a policy, the information processing device 10 extracts a transmission area (e.g., a range of an IP address) as information for detecting a suspicious communication.

In extraction of a transmission source, the transmission-source extraction unit 130 may use processing data in addition to a frequency and a transmission-source extraction policy.

The transmission-source extraction unit 130 transmits the extracted transmission source to a predetermined device or configuration. Alternatively, when the transmission-source extraction unit 130 includes a non-illustrated display unit, the transmission-source extraction unit 130 may display the extracted transmission source.

The transmission-source extraction unit 130 may extract, from communication data, communication data related to the extracted transmission source. For example, the transmission-source extraction unit 130 may extract, from communication data, communication data including the extracted transmission source, as a transmission source or a destination. The transmission-source extraction unit 130 may output the extracted communication data in association with the extracted transmission source. In this case, the user of the information processing device 10 can acquire communication data related to a transmission source extracted based on a predetermined policy (a data extraction policy, a counting policy, and a transmission-source extraction policy).

FIG. 1 illustrates this operation by using a broken line.

[Description of Operation]

Next, an operation of the information processing device 10 according to the first example embodiment is described with reference to the drawings.

Figure 2:
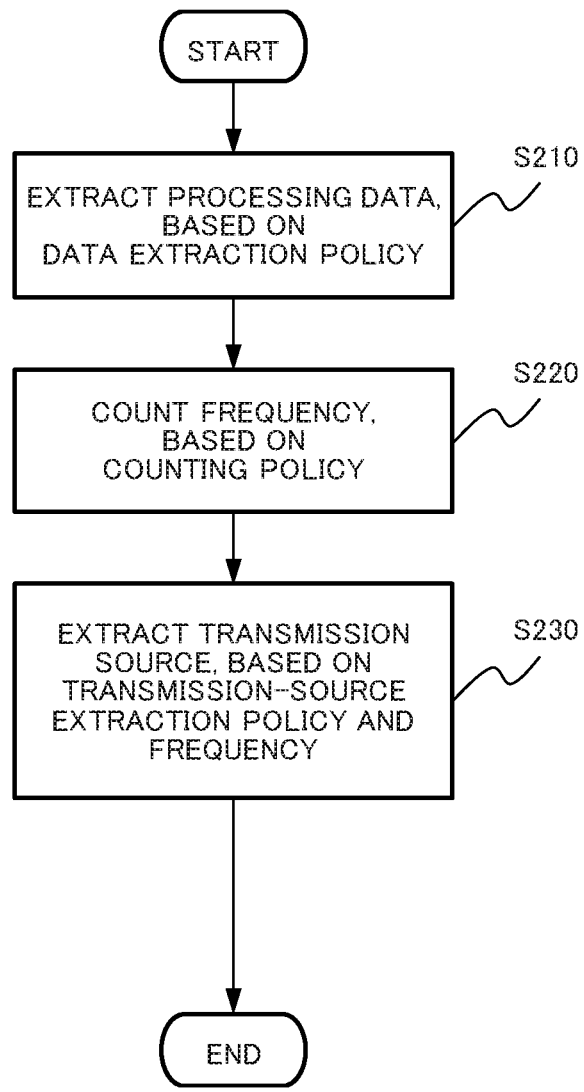
FIG. 2 is a flowchart illustrating one example of an operation of the information processing device according to the first example embodiment.

FIG. 2 is a flowchart illustrating one example of the operation of the information processing device 10 according to the first example embodiment.

First, the data extraction unit 110 extracts, based on a data extraction policy, processing data from communication data (step S210). In the present case, the information processing device 10 extracts a transmission source as information for detecting a suspicious communication. Thus, the data extraction policy includes at least a transmission source and a communication time. The data extraction policy may also include other data (e.g., a destination).

FIG. 3 is a diagram illustrating communication data used for description of an operation of the information processing device 10 according to the first example embodiment.

FIG. 3 illustrates, as one example of communication data, a part of data used for general transmission control protocol/internet protocol (TCP/IP). Although data in the following description of FIG. 3 and the like illustrate communication data for several days for a reason of illustration, this does not limit the present example embodiment. The information processing device 10 according to the first example embodiment can process a larger amount of communication data than communication data illustrated in FIG. 3. For example, FIG. 13 represents a distribution, based on a frequency counted by the information processing device 10 according to the present example embodiment.

Figure 4:
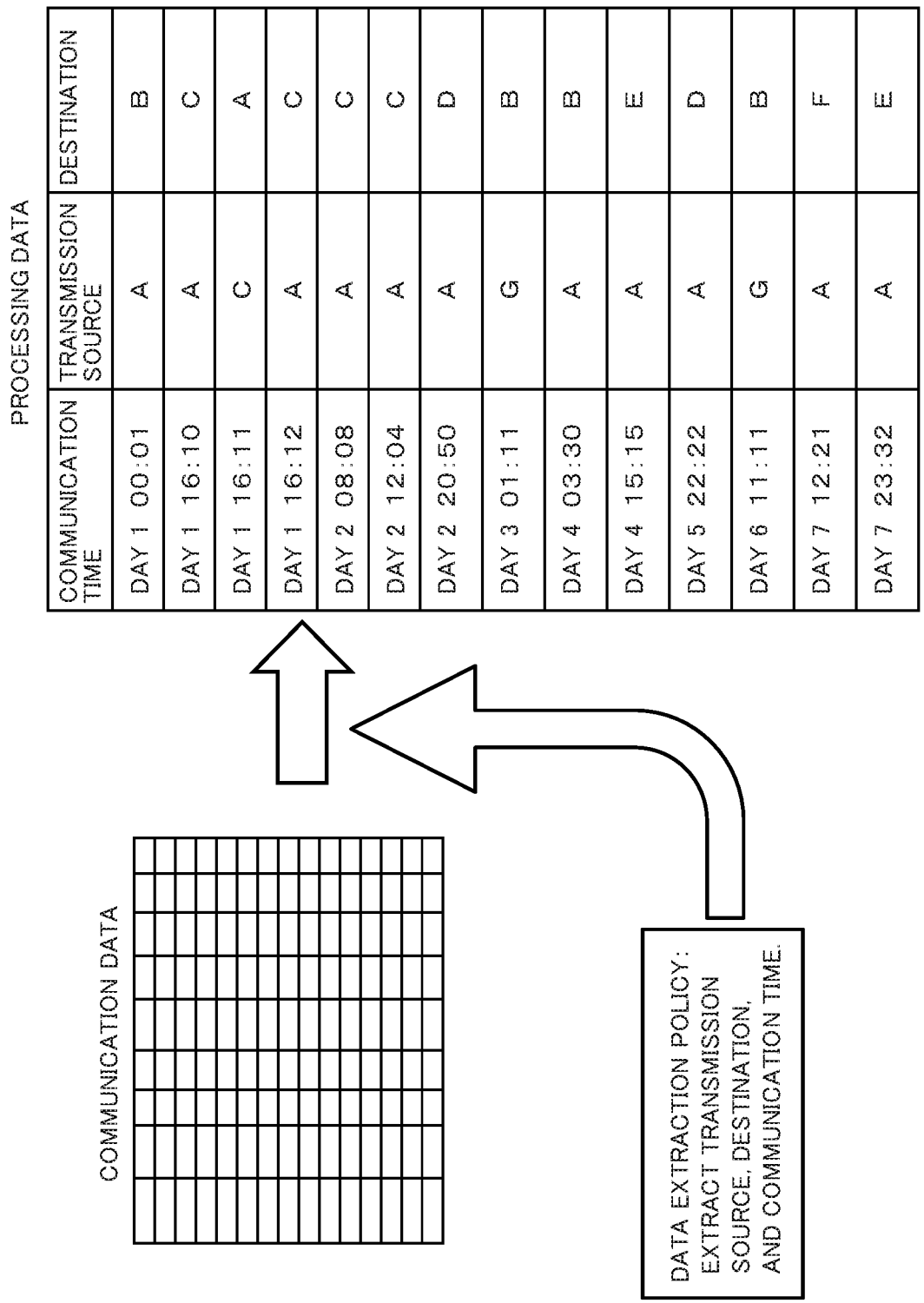
FIG. 4 is a diagram for describing an extraction operation in a data extraction unit according to the first example embodiment.

FIG. 4 is a diagram for describing an extraction operation in the data extraction unit 110 according to the first example embodiment. In the example illustrated in FIG. 4, the data extraction unit 110 extracts processing data including a transmission source, a destination, and a communication time from the communication data illustrated in FIG. 3, based on a data extraction policy indicating "extract a transmission source, a destination, and a communication time". In FIG. 4, representation of content of communication data is omitted for a reason of illustration.

The description returns to the description referring to FIG. 2.

The counting unit 120 counts a frequency related to processing data, based on a counting policy (step S220). Specifically, the counting unit 120 counts a frequency relating to a transmission source in processing data. The counting unit 120 may count a frequency relating to a combination of a transmission source and other data (e.g., a destination, a protocol, and/or a port).

Figure 5:
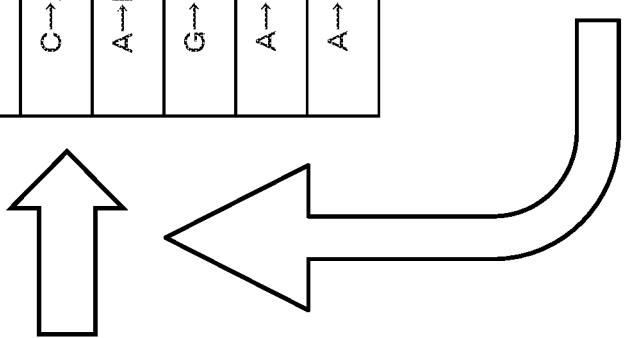
FIG. 5 is a diagram for describing an operation in a counting unit according to the first example embodiment.

FIG. 5 is a diagram for describing an operation in the counting unit 120 according to the first example embodiment. In the example illustrated in FIG. 5, the counting unit 120 counts a frequency (frequency data in FIG. 5) based on a counting policy indicating "count a frequency, an initial time, and an end period for each combination of a transmission source and a destination".

The description returns to the description referring to FIG. 2.

The transmission-source extraction unit 130 extracts a transmission source, based on a transmission-source extraction policy and a frequency (step S230). In other words, the transmission-source extraction unit 130 extracts a transmission source satisfying the transmission-source extraction policy in the counted frequency (e.g., frequency data in FIG. 5).

Figure 6:
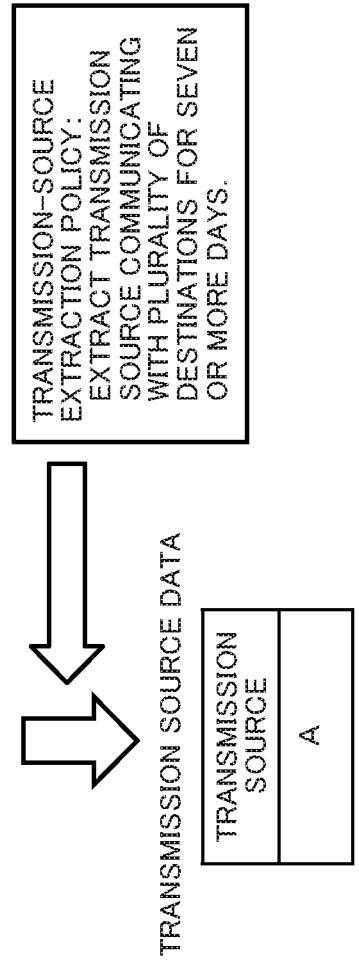
FIG. 6 is a diagram for describing an operation in the transmission-source extraction unit according to the first example embodiment.

FIG. 6 is a diagram for describing an operation in the transmission-source extraction unit 130 according to the first example embodiment. In the example illustrated in FIG. 6, the transmission-source extraction unit 130 extracts a transmission source "A" from frequency data, based on a transmission-source extraction policy indicating "extract a transmission source communicating with a plurality of destinations for seven or more days".

Furthermore, the transmission-source extraction unit 130 may execute an operation using the extracted transmission source. For example, the transmission-source extraction unit 130 may extract a transmission source, or communication data extracted by a destination as a transmission source (herein, the transmission source "A").

Description of Advantageous Effect

Thus, the information processing device 10 according to the first example embodiment can exert an advantageous effect of acquiring information (e.g., a transmission source of communication) for detecting a suspicious communication, without requiring an unauthorized infringement.

A reason for this is as follows.

The information processing device 10 includes the data extraction unit 110, the counting unit 120, and the transmission-source extraction unit 130. The data extraction unit 110 extracts, based on a data extraction policy being a policy for extracting the processing data used for counting a frequency related to a transmission source form communication data, the processing data the from communication data. The counting unit 120 counts, based on a counting policy being a policy for counting the frequency relating to the transmission source in the processing data, the frequency related to the transmission source in the processing data. The transmission-source extraction unit 130 extracts, based on a transmission-source extraction policy being a policy for extracting the transmission source, and the frequency, the transmission source.

Generally, a unit (e.g., a packet) of one piece of communication data becomes several thousand bytes on average when a header and a payload are added together. Further, a general communication amount per month in a single organization becomes several tens GB to several hundreds GB. When communication data are used without change, processing thereof requires to process a large amount of data.

However, the data extraction unit 110 extracts, as processing data, some pieces of data (e.g., a communication time, a transmission source, and a destination) from communication data including a large amount of data, based on a data extraction policy. Each piece of processing data is a piece of data of several bytes to several tens of bytes.

Thus, the counting unit 120 can count, based on a counting policy, a frequency related to a transmission source in processing data over a long period (e.g., several days to several months).

Furthermore, as a result, the transmission-source extraction unit 130 can extract a transmission source, based on a transmission-source extraction policy, and based on a predetermined communication state (e.g., a communication frequency equal to or more than a predetermined threshold value in a predetermined period) of a transmission source for a long period.

The information processing device 10 extracts, based on the above-described operation, a transmission source from communication data for a long period, by using a policy for detecting a suspicious communication. Communication data treated by the data extraction unit 110 do not need to include an actual unauthorized intrusion. In other words, the information processing device 10 according to the first example embodiment can exert an advantageous effect of acquiring information (e.g., a transmission source of communication) for detecting a suspicious communication, without requiring an unauthorized infringement.

Second Example Embodiment

When communication data are selected by using a transmission source extracted by an information processing device 10, communication data after selection are communication data related to a transmission source extracted based on a predetermined period.

Furthermore, the number of pieces of communication data after selection is reduced as compared with a total number of pieces of communication data.

In a case where the information processing device 10 uses communication data after selection using a transmission source, an amount of processing data to be a targeted for processing by a counting unit 120 can be reduced as compared to a case where all the communication data are used, even when a data extraction unit 110 includes a larger amount of data in processing data. Further, in this case, the counting unit 120 can count frequencies related to more data in communication data related to a specific transmission source. The transmission-source extraction unit 130 can extract a transmission source by using frequencies that are extracted by using more data. In other words, the counting unit 120 and the transmission-source extraction unit 130 can use more data in relation to a transmission source.

Thus, as a second example embodiment, an information processing device 11 including processing using a transmission source extracted in the first example embodiment is described.

The information processing device 11 according to the second example embodiment first executes an operation similar to that of the information processing device 10 according to the first example embodiment. Hereinafter, an operation similar to that in the first example embodiment is also referred to as an "operation for the first time". Further, each policy (a data extraction policy, a counting policy, and a transmission-source extraction policy) used for the operation for the first time is referred to as a first policy (a first data extraction policy, a first counting policy, and a first transmission-source extraction policy).

The information processing device 11 according to the second example embodiment executes an operation in which at least a part of the policy (the data extraction policy, the counting policy, and the transmission-source extraction policy) is changed, by using a transmission source extracted based on the policy for the first time. Hereinafter, an operation using the extracted transmission source is also referred to as an "operation for the second time". Further, each policy (a data extraction policy, a counting policy, and a transmission-source extraction policy) used for the operation for the second time is referred to as a second policy (a second data extraction policy, a second counting policy, and a second transmission-source extraction policy). At least part of the second policy may be the same as the first policy, and may not be included in the first policy.

[Description of Configuration]

First, a configuration of the information processing device 11 according to the second example embodiment is described with reference to the drawings.

Figure 7:
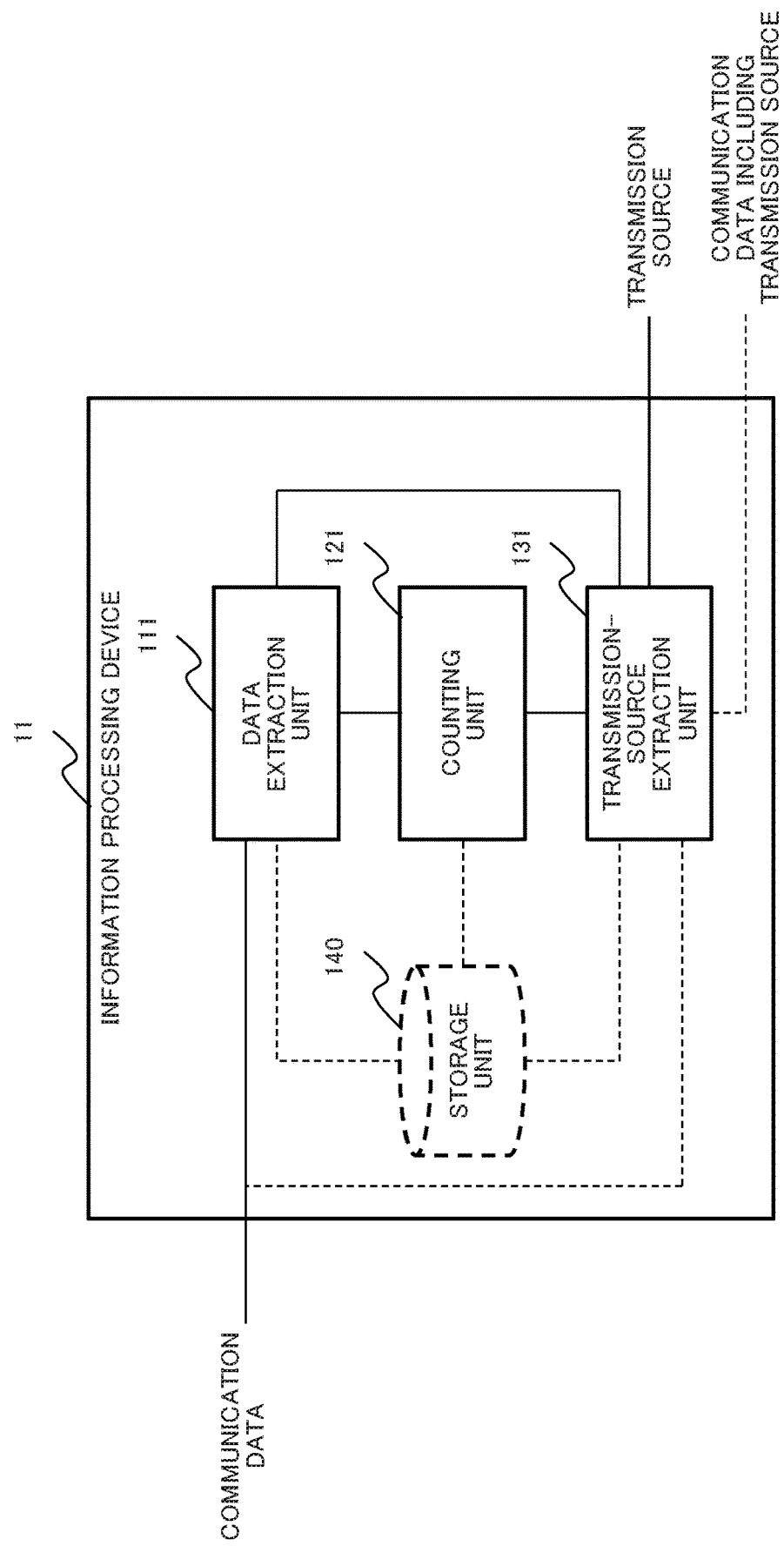
FIG. 7 is a block diagram illustrating one example of a configuration of an information processing device according to a second example embodiment.

FIG. 7 is a block diagram illustrating one example of a configuration of the information processing device 11 according to the second example embodiment.

The information processing device 11 includes a data extraction unit 111, a counting unit 121, and a transmission-source extraction unit 131. The information processing device 11 may include or not include a storage unit 140.

First, the configuration of the information processing device 11 operates similarly to the configuration of the information processing device 10.

Specifically, the data extraction unit 111 extracts processing data (hereinafter, referred to as "first processing data") from communication data, based on the first data extraction policy, similarly to the data extraction unit 110 according to the first example embodiment.

Then, similarly to the counting unit 120 according to the first example embodiment, the counting unit 121 counts a frequency (hereinafter, referred to as "first frequency") related to the transmission source in the first processing data, based on the first counting policy.

Then, similarly to the transmission-source extraction unit 130 according to the first example embodiment, the transmission-source extraction unit 131 extracts a transmission source, based on the first frequency and the first data extraction policy.

The operation so far (the operation for the first time) is similar to that in the first example embodiment.

The transmission-source extraction unit 131 transmits the extracted transmission source to the data extraction unit 111.

The data extraction unit 111 extracts processing data (hereinafter, referred to as "second processing data"), based on the second data extraction policy, by targeting, for processing, communication data related to the received transmission source. Specifically, the data extraction unit 111 selects communication data by using the received transmission source, and extracts second processing data based on the second data extraction policy, in the selected communication data.

The second data extraction policy is not limited. The second data extraction policy is a policy including at least one piece of data that is not included in the first processing data among data included in the communication data. In other words, the second processing data are data including at least one piece of data that is not included in the first processing data.

One example of data that are not included in the first processing data is "data included in each piece of communication data that is not included in the first processing data".

For example, when communication data include "a transmission source, a communication time, a destination, and a protocol", and first processing data include "a transmission source and a communication time", "data included in communication data that are not included in the first processing data" are "a destination" and/or a "protocol". For example, the data extraction unit 111 may use "a communication time, a transmission source, a destination, a protocol, and a destination port" as the second data extraction policy.

The second data extraction policy is not limited to a policy for adding "data included in each piece of communication data that are not included in the first processing data", to the first data extraction policy.

For example, data that are not included in the first processing data may be "communication data that are not used for extraction of the first processing data".

For example, the second data extraction policy may be a policy in which an extraction period or the like is changed in the first data extraction policy. For example, when the first processing data are extracted from a predetermined period, "communication data that are not used for extraction of the first processing data" may be communication data in another period. Specifically, for example, the data extraction unit 111 changes a period for extracting communication data, and selects communication data to be a target, by using a transmission source in communication data included in the changed extraction period. A change of an extraction period is movement of a period, reduction of a period, enlargement of a period, or the like.

Furthermore, the data extraction unit 111 does not limit communication data related to the received transmission source, i.e., communication data to be targeted for extraction. For example, the data extraction unit 111 may target, for extraction, communication data including a received transmission source, as a transmission source. Alternatively, the data extraction unit 111 may target, for extraction, communication data including a received transmission source, as a transmission source or a destination.

The counting unit 121 counts, based on a second counting policy, a frequency (hereinafter, referred to as a "second frequency") related to a transmission source related to the second processing data.

The second counting policy is a policy for counting the second frequency related to the transmission source in the second processing data. The second counting policy is not limited. The second counting policy may be determined in line with a transmission source to be extracted next, or the like. The second counting policy may be the same as the first counting policy.

The counting unit 121 may not count the second frequency in the operation for the second time. In other words, the information processing device 11 may not use the second counting policy.

The transmission-source extraction unit 131 extracts a transmission source, based on the second transmission-source extraction policy, by using the second frequency.

The second transmission-source extraction policy is not limited. For example, the second transmission-source extraction policy may include a policy relating to a destination or the like, in addition to a transmission source.

When the counting unit 121 does not count the second frequency, the transmission-source extraction unit 131 may extract a transmission source by using the second processing data and the second transmission-source extraction policy without using the second frequency. In this case, the second transmission-source extraction policy is a policy for extracting a transmission source from the second processing data.

Even when the counting unit 121 counts a frequency, the transmission-source extraction unit 131 may use the second processing data in addition to the second frequency and the second transmission-source extraction policy, in extraction of a transmission source.

Furthermore, the information processing device 11 may repeat the above-described "operation for the second time". For example, the information processing device 11 may prepare three policies (a data extraction policy, a counting policy, and a transmission-source extraction policy), and execute an operation for a third time similarly to the second time. Alternatively, the information processing device 11 may repeat extraction of a transmission source by using more than three policies.

In the operations for and after the third time, a range of a transmission source that the data extraction unit 111 uses for selection of communication data is not limited.

For example, the data extraction unit 111 may use, for selection of communication data to be an extraction target, a transmission source extracted immediately before the selection. In this case, the number of pieces of communication data selected by using a transmission source changes with a transmission source extracted immediately before the selection. In other words, the number of pieces of communication data to be an extraction target for and after the third time may be larger or smaller than that in a previous time.

Alternatively, in the operation for and after the third time, the data extraction unit 111 may use, for selection of communication data to be an extraction target, all transmission sources extracted so far. In this case, the number of pieces of communication data selected by using a transmission source monotonously decreases.

Thus, for example, the information processing device 11 may include, in a data extraction policy, information relating to a transmission source used for selection of communication data to be a processing target.

[Description of Operation]

Next, an operation of the information processing device 11 according to the second example embodiment is described with reference to the drawings.

Figure 8:
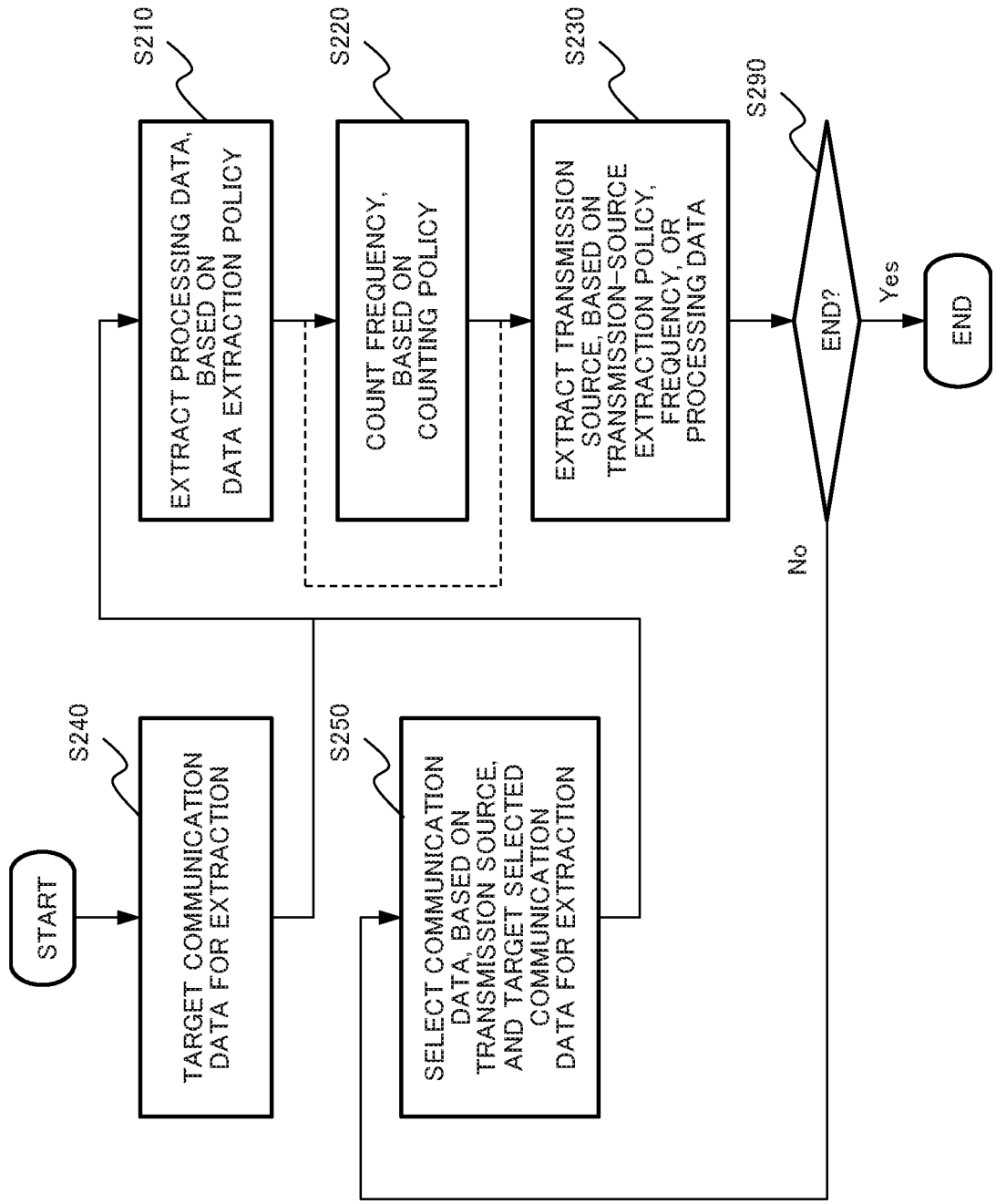
FIG. 8 is a flowchart illustrating one example of an operation of the information processing device according to the second example embodiment.

FIG. 8 is a flowchart illustrating one example of the operation of the information processing device 11 according to the second example embodiment. In FIG. 8, the same reference sign is given to an operation similar to that in FIG. 2. Detailed description of a similar operation is omitted as appropriate.

(Operation for First Time)

First, the Data Extraction Unit 111 Targets all Communication Data for extraction (step S240).

The data extraction unit 111 extracts first processing data, based on a first data extraction policy (step S210).

The counting unit 121 counts a first frequency related to the first processing data, based on a first counting policy (step S220). For example, the counting unit 121 counts an appearance frequency of the first processing data.

The transmission-source extraction unit 131 extracts a transmission source, based on the first frequency and a first transmission-source extraction policy (step S230).

The information processing device 10 determines whether the operation ends (step S290).

When the operation ends (Yes in step S290), the information processing device 11 ends processing.

When the operation does not end (No in step S290), the transmission-source extraction unit 131 transmits the extracted transmission source to the data extraction unit 111, and the operation advances to step S250.

(Operation for Second Time)

The data extraction unit 111 selects communication data being an extraction target from communication data by using a transmission source (e.g., a transmission source "A") (step S250). When the transmission-source extraction unit 131 selects communication data by using an extracted transmission source, the data extraction unit 111 may use the data.

The data extraction unit 111 extracts second processing data from the selected communication data, based on a second data extraction policy (step S210).

The counting unit 121 counts a second frequency related to the second processing data, based on a second counting policy (step S220). For example, the counting unit 121 counts an appearance frequency of the second processing data.

The transmission-source extraction unit 131 extracts a transmission source, based on the second frequency and a second transmission-source extraction policy (step S230).

The information processing device 11 may omit the operation in step S220 for the second time. FIG. 8 illustrates this case by using a broken line. In this case, the transmission-source extraction unit 131 extracts a transmission source, based on the second processing data and a second transmission-source extraction policy.

The operation of the information processing device 11 is described by using specific data.

First, it is assumed that the information processing device 11 extracts a "transmission source A", as processing for a first time. Further, it is assumed that the data extraction unit 111 selects communication data including the extracted transmission source (A) as a transmission source or a destination. Further, it is assumed that the data extraction unit 111 uses, as a second data extraction policy, "extract a communication time, a transmission source, a destination, a protocol, and a destination port".

In this case, the data extraction unit 111 selects communication data including the extracted transmission source (A) as a transmission source or a destination. The data extraction unit 111 extracts second processing data, based on the second data extraction policy.

Specifically, the data extraction unit 111 extracts second processing data from the communication data illustrated in FIG. 3 by using the transmission source A and the second data extraction policy.

FIG. 9 is a diagram illustrating one example of second processing data (processing data for a second time) in the information processing device 11 according to the second example embodiment.

The second processing data illustrated in FIG. 9 includes a protocol and a destination port, in addition to processing data (first processing data) illustrated in FIG. 4 and the like. The protocol and the destination port are data of several bytes. The second processing data are data including an "address A of a transmission source" in a transmission source or a destination port, and do not include data related to "G→B" or the like included in the first processing data.

Referring to FIG. 9, when a destination C responds, the transmission source A continuously executes communication with the destination C. Thus, when adopting "extract a transmission source that executes predetermined transmission to a destination responding to the transmission source" as a second transmission-source extraction policy, the information processing device 11 can extract a transmission source operating in this way. More specifically, a second transmission-source extraction policy is, for example, "extract a transmission source executing a plurality of transmissions to a destination that responds". The above-described second transmission-source extraction policy is one example. For example, a "plurality of transmissions" are one example of transmission relating to a transmission source. A second transmission-source extraction policy may include, as transmission relating to a transmission source, not only a number such as a "plurality of transmissions" but also, for example, a kind of communication such as "transmission of a predetermined protocol" or "transmission to a predetermined port".

Extraction of a transmission source in this case does not require counting of a frequency in the counting unit 120. Thus, in this case, the information processing device 11 may not use the second counting policy. The operation of the information processing device 11 is not limited to this.

Description of Advantageous Effect

Thus, the information processing device 11 according to the second example embodiment can acquire an advantageous effect of further limiting a transmission source, in addition to an advantageous effect of the first example embodiment.

A reason for this is as follows.

The information processing device 11 includes the data extraction unit 111, the counting unit 121, and the transmission-source extraction unit 131. The configuration of the information processing device 11 operates similarly to the configuration of the information processing device 10. Further, the transmission-source extraction unit 131 transmits an extracted transmission source to the data extraction unit 111. The data extraction unit 111 selects communication data to be a target, by using the received transmission source, and extracts second processing data from the selected communication data. The counting unit 121 and the transmission-source extraction unit 131 execute counting of a frequency and extraction of a transmission source by using the second processing data that are limited by using the transmission source. Thus, the information processing device 11 can further limit a transmission source.

Overview of Example Embodiment

Next, an overview of the information processing device 10 and the information processing device 11 is described with reference to the drawings.

Figure 10:
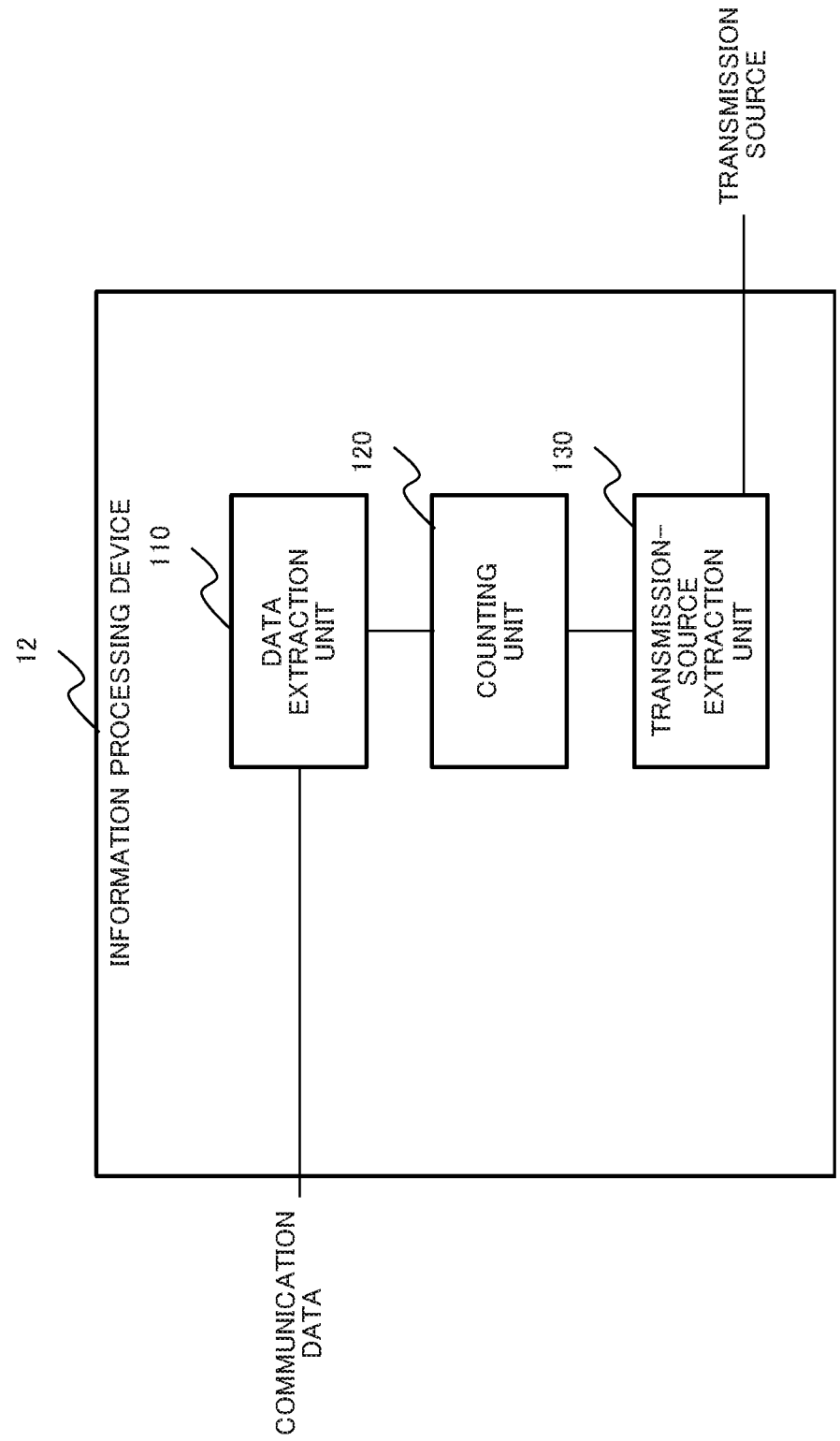
FIG. 10 is a block diagram illustrating one example of a configuration of an information processing device being a configuration of an overview of an example embodiment.

FIG. 10 is a block diagram illustrating one example of a configuration of an information processing device 12 being a configuration of an overview of an example embodiment.

The information processing device 12 includes a data extraction unit 110, a counting unit 120, and a transmission-source extraction unit 130. The data extraction unit 110 extracts, based on a first data extraction policy being a policy for extracting first processing data used for counting a first frequency related to a transmission source from communication data, the first processing data from the communication data. The counting unit 120 counts, based on a first counting policy being a policy for counting the first frequency relating to the transmission source in the first processing data, the first frequency related to the transmission source in the first processing data. The transmission-source extraction unit 130 extracts, based on a first transmission-source extraction policy being a policy for extracting the transmission source, and the first frequency, the transmission source.

The information processing device 12 configured in this way exerts an advantageous effect similar to that of the information processing device 10.

A reason for this is that the configuration included in the information processing device 12 performs an operation similar to that of the configuration included in the information processing device 10.

The information processing device 12 is a minimum configuration of the example embodiment in the present invention.

<Hardware Configuration>

A hardware configuration of each of the information processing devices 10, 11, and 12 is described by using the information processing device 10.

The information processing device 10 is configured as follows.

For example, each constituent unit of the information processing device 10 may be configured by a hardware circuit.

Alternatively, in the information processing device 10, each constituent unit may be configured by using a plurality of devices connected via a network.

Alternatively, in the information processing device 10, a plurality of constituent units may be configured by one piece of hardware.

Alternatively, the information processing device 10 may be achieved as a computer device including a central processing unit (CPU), a read only memory (ROM), and a random access memory (RAM). The information processing device 10 may be achieved as a computer device further including an input and output circuit (IOC) in addition to the components described above. The information processing device 10 may be achieved as a computer device further including a network interface circuit (NIC) in addition to the components described above.

Figure 11:
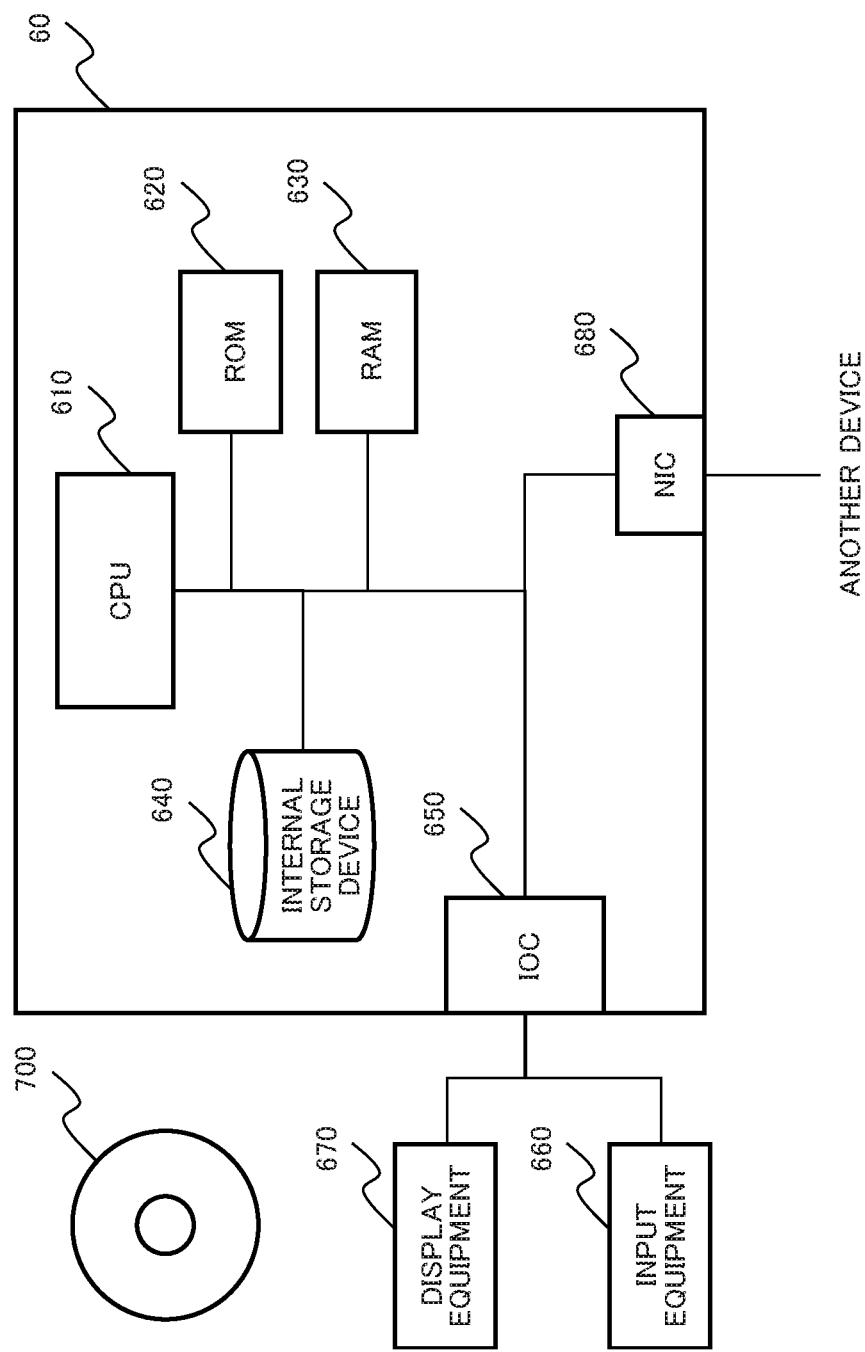
FIG. 11 is a block diagram illustrating one example of a hardware configuration of the information processing device.

FIG. 11 is a block diagram illustrating one example of a configuration of an information processing device 60 being one example of a hardware configuration of the information processing device 10.

The information processing device 60 includes a CPU 610, a ROM 620, a RAM 630, an internal storage device 640, an IOC 650, and an NIC 680, and constitutes a computer device.

The CPU 610 reads a program from the ROM 620. The CPU 610 controls the RAM 630, the internal storage device 640, the IOC 650, and the NIC 680, based on the read program. Then, a computer including the CPU 610 controls these components, and achieves each of functions of a data extraction unit 110, a counting unit 120, and a transmission-source extraction unit 130 illustrated in FIG. 1.

When achieving each of the functions, the CPU 610 may use the RAM 630 or the internal storage device 640 as a transitory storage medium of the program.

The CPU 610 may read a program included in a storage medium 700 storing the program in a computer-readable manner, into the RAM 630 or the internal storage device 640 by using a non-illustrated storage medium reading device. Alternatively, the CPU 610 may receive a program from a non-illustrated external device via the NIC 680, and store the program in the RAM 630 or the internal storage device 640. The CPU 610 may operate based on the read or stored program.

The ROM 620 stores a program executed by the CPU 610, or fixed data. The ROM 620 is, for example, a programmable ROM (P-ROM) or a flash ROM.

The RAM 630 transitorily stores a program executed by the CPU 610, or data. The RAM 630 is, for example, a dynamic RAM (D-ROM).

The internal storage device 640 stores data and a program stored in the information processing device 60 for a long period. The internal storage device 640 may operate as a transitory storage device of the CPU 610. The internal storage device 640 is, for example, a hard disk device, a magnet-optical disk device, a solid state drive (SSD), or a disk array device. The internal storage device 640 may operate as a storage unit 140.

Herein, the ROM 620 and the internal storage device 640 are non-transitory storage media. On the other hand, the RAM 630 is a transitory storage medium. The CPU 610 is operable, based on a program stored in the ROM 620, the internal storage device 640, or the RAM 630. In other words, the CPU 610 is operable by using a non-transitory storage medium or a transitory storage medium.

The IOC 650 mediates data between the CPU 610, and input equipment 660 and display equipment 670. The IOC 650 is, for example, an IO interface card or a universal serial bus (USB) card. Further, the IOC 650 is not limited to a wired form such as a USB, and may use a wireless form.

The input equipment 660 is equipment that receives an input instruction from an operator of the information processing device 60. The input equipment 660 is, for example, a keyboard, a mouse, or a touch panel. The information processing device 60 may receive a part or the entirety of a policy from the input equipment 660.

The display equipment 670 is equipment that displays information to the operator of the information processing device 60. The display equipment 670 is, for example, a liquid crystal display. The information processing device 60 may display an extracted transmission source to the display equipment 670.

The NIC 680 relays exchange of data with a non-illustrated external device via a network. The NIC 680 is, for example, a local area network (LAN) card. Further, the NIC 680 is not limited to a wired form, and may use a wireless form. The information processing device 60 may receive a part or the entirety of a policy via the NIC 680. Alternatively, the information processing device 60 may output an extracted transmission source via the NIC 680.

The information processing device 60 configured in this way can acquire an advantageous effect similar to that of the information processing device 10.

A reason for this is that the CPU 610 of the information processing device 60 can achieve a function similar to that of the information processing device 10, based on a program.

<Information Processing System>

Next, an information processing system 50 including an information processing device 10 is described with reference to the drawings.

Figure 12:
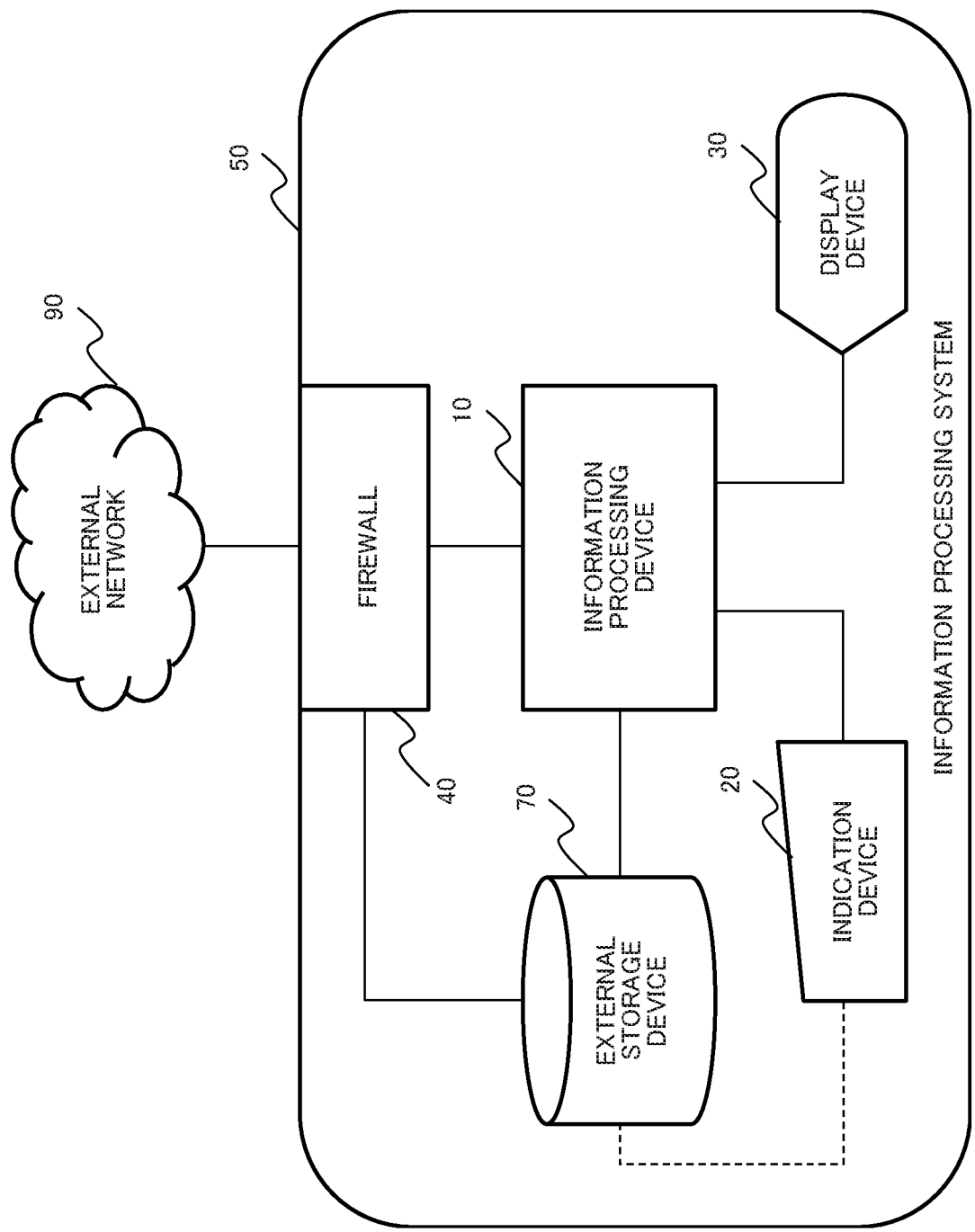
FIG. 12 is a block diagram illustrating one example of a configuration of an information processing system including the information processing device.

FIG. 12 is a block diagram illustrating one example of a configuration of the information processing system 50 including the information processing device 10.

The information processing system 50 includes the information processing device 10, an indication device 20, a display device 30, and a firewall 40. The information processing system 50 may further include an external storage device 70.

The information processing system 50 may include an information processing device 11 or 12 instead of the information processing device 10.

The external storage device 70 stores communication data. For example, the firewall 40 may store received communication data in the external storage device 70. Alternatively, the information processing device 10 or the indication device 20 may receive and then store communication data from a non-illustrated device.

The indication device 20 indicates (transmits) at least a part of a policy (a data extraction policy, a counting policy, and a transmission-source extraction policy) to the information processing device 10. For example, a user of the information processing system 50 may set all the policies in the information processing device 10 by operating the indication device 20. The information processing device 10 may hold a part of the policies, and receive the rest of the policies. Alternatively, a user may change a policy by using the indication device 20.

The information processing device 10 extracts a transmission source from communication data, based on a policy received from the indication device 20 and/or a stored policy. When the external storage device 70 stores communication data, the information processing device 10 may use the communication data stored in the external storage device 70. Alternatively, the information processing device 10 may process communication data indicated from the indication device 20.

The information processing device 10 transmits an extracted transmission source to the display device 30 and the firewall 40. The information processing device 10 may transmit, in addition to the transmission source, information (e.g., communication data, processing data, and/or a frequency) related to communication of the transmission source to the display device 30 and/or the firewall 40.

The display device 30 displays the received transmission source. When receiving communication data, a frequency, and/or the like, the display device 30 may display the communication data, the frequency, and/or the like according to the transmission source.

A user of the information processing system 50 may request the information processing device 10 for processing in which a policy or the like is changed, by operating the indication device 20, based on a transmission source or the like displayed on the display device 30. For example, a user may search for a transmission source having a risk of executing an unauthorized communication, by operating the indication device 20.

The firewall 40 relays a communication between an external network 90 and a non-illustrated device inside the information processing system 50, and blocks a predetermined communication in order to ensure security of the information processing system 50. Specifically, the firewall 40 blocks at least a communication relating to a transmission source received from the information processing device 10. For example, the firewall 40 blocks all communications from a received transmission source. Alternatively, the firewall 40 may receive a received transmission source and a protocol related to the transmission source, and block communication data related to the received protocol from the transmission source. Based on such an operation, the firewall 40 can block a communication relating to a transmission source extracted by the information processing device 10, and ensure security of the information processing system 50.

The information processing device 10 may be a device inside the information processing system 50, or may be an external device.

The configuration of the information processing system 50 is not limited to the configuration in FIG. 12. The information processing device 10 may include the indication device 20, the display device 30, the firewall 40, and/or the external storage device 70.

Connection of each device is not limited. Each device may be directly connected as illustrated in FIG. 12, or may be connected via a non-illustrated network (e.g., an intra network) or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Information processing device
11 Information processing device
12 Information processing device
20 Indication device
30 Display device
40 Firewall
50 Information processing system
60 Information processing device
70 External storage device
90 External network
110 Data extraction unit
111 Data extraction unit
120 Counting unit
121 Counting unit
130 Transmission-source extraction unit
131 Transmission-source extraction unit
140 Storage unit
610 CPU
620 ROM
630 RAM
640 Internal storage device
650 IOC
660 Input equipment
670 Display equipment
680 NIC
700 Storage medium

The invention claimed is:

1. An information processing device comprising:
a memory; and
at least one processor coupled to the memory,
the processor performing operations, the operations comprising:
extracting, based on a first data extraction policy being a policy for extracting first processing data to be used for counting a first frequency related to a transmission source from communication data and including at least the transmission source, a destination and a communication time, the first processing data from the communication data for a period from months to years so that the first processing data includes at least the transmission source included in an external network, and a destination included in an internal network;

counting, based on a first counting policy being a policy for counting the first frequency relating to the transmission source in the first processing data, the first frequency being a frequency of a combination of the transmission source and the destination in the first processing data and being a frequency for a period from a day to years; and extracting, based on a first transmission-source extraction policy being a policy for extracting the transmission source and the first frequency, the transmission source that has the first frequency exceeding a threshold value or included in a range and executes a plurality of transmissions to the destination that responds, wherein the communication data is data that is indistinguishable from normal communication and is not determined to be fraudulent, and the first data extraction policy is header data in the communication data.

2. The information processing device according to claim 1, wherein
the first data extraction policy includes at least the transmission source and a communication time in the communication data,
the first counting policy includes at least a period related to counting and data included in the first processing data to be targeted for counting, and
the first transmission-source extraction policy includes a threshold value or a range of the first frequency relating to the transmission source to be an extraction target.

3. The information processing device according to claim 1, wherein the operations further comprise
extracting, from the communication data that includes at least one piece of data that is not included in the first processing data among data included in the communication data and includes the transmission source extracted based on a second data policy being a policy for extracting a second processing data to be used for calculating a frequency related to the transmission source, the second processing data,
counting a second frequency related to the transmission source in the second processing data, based on a second counting policy being a policy for counting the second frequency related to the transmission source in the second processing data, and
extracting the transmission source, based on a second transmission-source extraction policy being a policy for extracting the transmission source, and the second frequency.

4. The information processing device according to claim 1, wherein the operations further comprise
extracting, from the communication data that includes at least one piece of data that is not included in the first processing data among data included in the communication data and includes the transmission source extracted based on a second data policy being a policy for extracting the second processing data to be used for calculating a frequency related to the transmission source, the second processing data, and
extracting the transmission source, based on a second transmission-source extraction policy being a policy for extracting the transmission source from the second processing data, and the second processing data.

5. The information processing device according to claim 1, wherein
the first data extraction policy further includes a destination in the communication data, and
the first counting policy includes, as the first frequency, a frequency related to a combination of the transmission source and the destination.

6. The information processing device according to claim 3, wherein
the first data extraction policy further includes a destination in the communication data, and
the second transmission-source extraction policy
includes a policy for extracting the transmission source executing predetermined transmission to the destination responding to the transmission source.

7. An information processing method comprising:
extracting, based on a first data extraction policy being a policy for extracting first processing data to be used for counting a first frequency related to a transmission source from communication data and including at least the transmission source, a destination and a communication time, the first processing data from the communication data for a period from months to years so that the first processing data includes at least the transmission source included in an external network, and a destination included in an internal network;
counting, based on a first counting policy being a policy for counting the first frequency relating to the transmission source in the first processing data, the first frequency being a frequency of a combination of the transmission source and the destination in the first processing data and being a frequency for a period from a day to years; and
extracting, based on a first transmission-source extraction policy being a policy for extracting the transmission source and the first frequency, the transmission source that has the first frequency exceeding a threshold value or included in a range and executes a plurality of transmissions to the destination that responds,
wherein the communication data is data that is indistinguishable from normal communication and is not determined to be fraudulent, and the first data extraction policy is header data in the communication data.

8. A non-transitory computer-readable recording medium embodying a program, the program causing a computer to perform a method, the method comprising:
extracting, based on a first data extraction policy being a policy for extracting first processing data to be used for counting a first frequency related to a transmission source from communication data and including at least the transmission source, a destination and a communication time, the first processing data from the communication data for a period from months to years so that the first processing data includes at least the transmission source included in an external network, and a destination included in an internal network;
counting, based on a first counting policy being a policy for counting the first frequency relating to the transmission source in the first processing data, the first frequency being a frequency of a combination of the transmission source and the destination in the first processing data and being a frequency for a period from a day to years; and
extracting, based on a first transmission-source extraction policy being a policy for extracting the transmission source and the first frequency, the transmission source that has the first frequency exceeding a threshold value or included in a range and executes a plurality of transmissions to the destination that responds,
wherein the communication data is data that is indistinguishable from normal communication and is not determined to be fraudulent, and the first data extraction policy is header data in the communication data.

\* \* \* \* \*